United States Patent [19]

Fung

[11] Patent Number: 4,472,515
[45] Date of Patent: * Sep. 18, 1984

[54] LOW TEMPERATURE DECOKING PROCESS FOR REACTIVATING IRIDIUM CONTAINING CATALYSTS

[75] Inventor: Shun C. Fung, Bridgewater, N.J.

[73] Assignee: Exxon Research and Engineering Co., Florham Park, N.J.

[ * ] Notice: The portion of the term of this patent subsequent to Sep. 18, 2011 has been disclaimed.

[21] Appl. No.: 375,230

[22] Filed: May 5, 1982

[51] Int. Cl.$^3$ .................... B01J 23/96; C10G 35/09; C10G 35/085

[52] U.S. Cl. .................................... 502/37; 208/140; 502/36

[58] Field of Search ............................. 252/415, 441; 502/35–37, 230; 208/140

[56] References Cited

U.S. PATENT DOCUMENTS

| | | |
|---|---|---|
| 3,622,520 | 11/1971 | Hayes . |
| 3,625,860 | 12/1971 | Condrasky . |
| 3,904,510 | 9/1975 | Sinfelt et al. . |
| 3,937,600 | 2/1976 | Yates et al. . |
| 3,939,061 | 2/1976 | Paynter et al. . |
| 3,939,062 | 2/1976 | Sinfelt et al. . |
| 3,941,682 | 3/1976 | Kmak et al. . |
| 3,941,716 | 3/1976 | Paynter . |
| 3,943,052 | 3/1976 | Kmak et al. . |
| 3,981,823 | 9/1976 | Yates . |
| 4,046,673 | 9/1977 | Paynter et al. . |
| 4,159,938 | 7/1979 | Lewis . |
| 4,172,817 | 10/1979 | Yates et al. . |
| 4,359,400 | 11/1982 | Landolt et al. .................... 252/441 |

FOREIGN PATENT DOCUMENTS

| | | |
|---|---|---|
| 0057551 | 11/1982 | European Pat. Off. . |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North; Edward H. Mazer

[57] ABSTRACT

A process is disclosed for reactivating a coked and agglomerated iridium-containing catalyst and particularly platinum-iridium on alumina reforming catalysts. The process includes a low temperature decoking step to achieve partial decoking while minimizing agglomeration, a reducing step involving contacting the decoked agglomerated catalyst with a reducing gas such as hydrogen to reduce agglomerated iridium oxides to the free metal, a halide pretreatment step to increase the chloride level of the catalyst to about 1.3 weight percent and above, and a halogen redispersion step. The redispersion step is performed with a mixture of elemental halogen and water vapor.

14 Claims, No Drawings

LOW TEMPERATURE DECOKING PROCESS FOR REACTIVATING IRIDIUM CONTAINING CATALYSTS

BACKGROUND OF THE INVENTION

This invention relates to a process for reactivating a coked, agglomerated iridium-containing catalyst involving the sequential steps of low temperature decoking to minimize agglomeration, reducing agglomerated iridium oxides on the catalyst surface to the free metal, pretreating the catalyst surface with a halide-providing compound, preferably hydrogen halide, in the absence of elemental oxygen, and redispersing the iridium metal by contacting with a mixture containing elemental halogen and water at elevated temperature.

SUMMARY OF THE INVENTION

It has been found that coked and agglomerated iridium-containing catalysts can be efficiently and effectively redispersed and reactivated by the use of a low temperature decoking step below about 430° C. in an oxygen atmosphere, followed by a halide pretreatment, and then an elemental halogen/water redispersion step. The redispersion step substantially redisperses iridium metal on the catalyst surface and completes the decoking process.

The halide pretreatment step is conducted with two limitations; (1) that about 1.3 weight percent and above halide and preferably 1.4 to 2.5 weight percent halide, taken as the coke-free, dry catalyst, and most preferably saturated with halide under the conditions used, is present on the catalyst surface after the pretreatment and maintained at or above this level up to, and during the subsequent halogen redispersion step and (2) that during the halide pretreatment step, no elemental oxygen is present in the feedstream or is generated, in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium-containing catalysts and particularly to reforming catalysts employing platinum-iridium on alumina which are completely or partially decoked. Generally, halide-providing compounds are used in the pretreatment step, including organic halides and hydrogen halides, with gaseous hydrogen chloride being the preferred hydrogen halide-providing compound used in the pretreatment, and chloride levels of above about 1.3 weight percent of catalyst on the catalyst surface are necessary to insure effective redispersion. In the case of commercial, used catalysts, having lower surface areas because of use, the surface halide requirement will be slightly lower. The halide weight percent is expressed on the basis of dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-contaniing catalyst, the subject process will produce substantially decoked, highly redispersed, iridium-containing catalyst in a one-cycle treatment.

Primary advantages of the subject process are reducing the degree of metal agglomeration during the low temperature decoking process, and completing the catalyst decoking during a halogen/water redispersion step at high temperature.

In accordance with this invention, there is provided a process for reactivating coked iridium-containing catalysts comprising steps of:

(a) partially decoking said catalyst in an oxygen-containing atmosphere at a temperature below about 430° C. for a sufficient time so that the remaining catalyst coke level is less than 1 weight percent and the iridium agglomeration on said catalyst is less than about 50 percent;

(b) reducing said catalyst from step (a) by contact with a reducing atmosphere at elevated temperature for a sufficient time to substantially convert said iridium value to metallic iridium;

(c) pretreating said catalyst from step (b) by contact with an elemental oxygen-free atmosphere comprising a halide-providing compound at elevated temperature for a sufficient time to provide the catalyst with about 1.3 weight percent and above halide taken as the coke-free, dry catalyst; and (d) redispersing the metallic iridium catalyst from step (c) by contact with an atmosphere comprising elemental halogen and water at a temperature of about 480° C. and above for a time sufficient to substantially complete decoking and substantially redisperse metallic iridium.

DESCRIPTION OF THE INVENTION AND PREFERRED EMBODIMENTS

The subject process of the present invention includes a low temperature partial decoking step in combination with a halogen/water redispersion step, coupled with a halide pretreatment step, which enhances the potential of the process for mono-cycle reactivation/ redispersion and eliminates the need, as practiced in the prior art, for rigorous, extended multi-cycle hydrogen/ halogen treatment involving a high temperature decoking step.

Catalysts which can be treated by the subject process, as described above, include generally, iridium-containing catalysts, with and without co-catalysts, preferably being supported. Other metallic co-catalysts, with iridium, which are applicable in the process include metals such as, for example, platinum, rhodium, rhenium, palladium, mixtures thereof and the like. The metals can be present in bimetallic, trimetallic combinations and higher combinations as alloys, or physical mixtures, on the same support particles or where the metals are individually present on separate support particles. Preferred metal combinations in the catalyst for treatment by the subject process are platinum-iridium and platinum-iridium-rhenium.

The metals can be supported on a suitable support which is conventional, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

The first step of the subject process involves a low temperature partial decoking of the catalyst which is conducted by heating the spent catalyst in an atmosphere containing less than 1.0 volume percent oxygen and preferably less than 0.5 volume percent, at a temperature of below about 430° C. preferably in the range of about 375° to 430° C. to remove surface and embedded carbon deposits and particularly "active" carbon deposits which can react with halogen during the redispersion step to form halogenated species which are not readily removed from the catalyst surface. Generally, about 0.3 to 0.8 weight percent of carbon deposits are present after the decoking step and metal iridium agglomeration is present in about 50 numerical percent or less. The subject process is applicable to a wide range of agglomerated catalysts containing varying amounts of remaining carbon deposits, different degrees of agglomeration, varying particle size ranges and varying impurities.

The second step in the subject process is wherein said agglomerated catalyst is treated with a reducing atmosphere, generally comprising hydrogen gas, to convert metal values, which are usually present in the form of their oxides to the metallic metal, i.e., metallic iridium. This step generally involves the reducing of the metal oxides formed during decoking. Other reducing or inert gases may also be present including nitrogen, helium and the like. The reducing step is generally conducted by contacting the catalyst at an elevated temperature, generally in the range of about 250° to 600° C., preferably about 300° to 540° C., in a reducing atmosphere comprising about one volume percent hydrogen gas or above for a time to substantially reduce the metal oxide to the free metal, as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns are taken on the same catalysts used in reforming from which coke has been burned in numerous cycles of use generally show distinct metal lines which indicate highly agglomerated metal particles of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours, depending on the process conditions. Shorter and longer times are also applicable.

Following the reduction step, the partially decoked-reduced catalyst is then subjected to halide pretreatment with a halide-providing compound and by the term is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen, in a large excess over the stoichiometric amount, must also be used to convert the haloorgano compound to a hydrogen halide. The hydrogen halides can be hydrogen fluoride, hydrogen chloride, hydrogen bromide or hydrogen iodide. Preferably, hydrogen chloride is the halide-providing compound used in the process. The atmosphere contacting the catalyst in this step can contain other inert gases, e.g., nitrogen and the like, and also including water vapor for more uniform distribution of halide on the catalyst surface prior to the halogenation treatment, and also hydrogen gas or reducing gas to insure that the reduced catalyst remains in the reduced state during hydrogen halide pretreatment. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen.

The temperature of the halide pretreatment is generally conducted in the range of about 250° to 600° C. and preferably about 300°–540° C., and the halide providing compound, at the above-identified temperature, is contacted with the catalyst in a gaseous stream until about 1.3 weight percent halide or above is provided to the catalyst as detected, for example, by X-ray fluorescence. Preferably, the catalyst is pretreated to a range of about 1.4 to 2.5 weight percent halide or higher, and most preferably, up to saturation by halide of the catalyst surface. As described hereinabove, the weight percentage of halide provided to the catalyst is taken on a dry and coke-free catalyst basis. Where the catalyst has been extensively used in commercial processes having a lower surface area and catalytic activity as a result of this continued use, a minimum weight percentage of about one percent halide is reasonably believed to be effective in promoting high redispersion values in the subject process. For example, fresh catalysts having BET surface areas of 180 $m^2/g$ and higher will require 1.3 weight percent halide and above. Used catalysts having surface areas of about 100 to 180 $m^2/g$ will generally only require a minimum of 1 to 1.3 weight percent halide prior to redispersion. However, an exact minimum value cannot be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to the halogen redispersion treatment. If a "purge" of hydrogen, nitrogen, water, mixtures thereof, or other materials is used subsequent to the halide pretreatment, then such purge or contacting step should not reduce the halide level to below about 1.3 weight percent. If this happens, then the halide pretreatment should again be conducted to insure about 1.3 weight percent and above halide being present. This is particularly true in cases where multi-cycle treatment may be necessary, in which the weight percent of halide present on the catalyst must be replenished again to about 1.3 weight percent and above prior to each halogen redispersion treatment.

The halide pretreatment is conducted for sufficient time to achieve a particular halide loading, as described above. In practice, a fast flowing stream of preferably hydrogen chloride is contacted with the catalyst up to, and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading.

Time required for the halide pretreatment will, of course, be dependent on many factors including flow rate, hydrogen halide gaseous concentrations, amount of catalyst, and can be desirably adjusted, for example, to run for about 1 to 3 hours per catalyst regeneration, in general. Concentration of hydrogen halide can be from 0.05 to about 5 volume percent or higher in the feedstream, which can be at a total pressure of about 0.1 to 3 MPa. Higher and lower values of both variables can also be used effectively.

Following the halide pretreatment step, the partially decoked, reduced catalyst is then subjected to a halogen redispersion step by contacting the catalyst with a stream comprising a mixture of elemental halogen gas and water at elevated temperature. Elemental halogen gases applicable are fluorine, chlorine, bromine and iodine, with chlorine being a preferred embodiment.

The halogen/water redispersion step is generally carried out at a temperature of about 480° to 600° C. and preferably about 500° to 540° C.

The elemental halogen and water are present in the redispersion feedstream in a halogen/water volume ratio of about 0.2 to 5 and preferably 0.5 to 2 at elevated temperature, the water vapor is generally present mainly as steam.

The halogen/water atmosphere may also contain inert gases such as nitrogen or helium as carrier gases.

Halogen/water redispersion is generally conducted until breakthrough occurs as evidenced or detected, for example, by a starch-iodide indicator. Generally, this required about 0.5 to 2 hours of treatment for used catalyst, which depends upon flow rate, halogen and water concentrations in the feedstream and amount of catalyst. Generally, however, slightly longer times of halogen/water treatment are required for substantially complete redispersion, as evidenced by the absence of crystalline metal or metal oxide lines in the X-ray diffraction patterns. Preferably a time of about 30 to 90 minutes past breakthrough, i.e., substantially past breakthrough, is necessary for substantially complete redispersion assuming a halogen/water flowrate of about 1.1 grams chorine per 100 grams catalyst per hour, and above.

By carrying out the process described herein, substantially complete redispersions of iridium-containing catalysts is capable of being achieved and particularly those of platinum-iridium on alumina used in hydrocarbon reforming operations. In the latter case, 75 to 100 percent redispersion of both the platinum and iridium agglomerated metals may be achieved in the process.

By the term "substantially complete redispersion", as used herein, is meant redispersion values, as determined by X-ray diffraction, of greater than about 55 numerical percent and preferably about 75 to 100 numerical percent, of the iridium on the catalyst surface also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide content to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention, as contemplated by the inventors, and should not be construed as being limitations on the scope or spirit of the instant invention.

EXAMPLE 1

A quartz, tubular horizontal reactor was charged with about 60 grams of a coke-free platinum-iridium catalyst, wherein the iridium was 100 percent agglomerated, (produced by agglomeration at 540° C.). It contained 0.3 weight percent iridium and 0.3 weight percent platinum based on the total weight of the catalyst (BET surface area of 200 $m^2/g$). The catalyst was divided into three approximately equal sections with a quartz wool plug as a spacer between the sections. The catalyst in Section 1 was at the entry of the reactor and the catalyst in Section 3 was at the reactor exit. The chloride level on this catalyst was determined to be 0.67 weight percent.

The catalyst was treated with a gas mixture of 20 percent hydrogen in helium at one atmosphere for 2 hours at 524° C. At the end of hydrogen treatment, a gaseous mixture of 1 volume percent hydrogen chloride and 1.4 volume percent water in helium was allowed to contact the catalyst up to a point at which the concentration of hydrogen chloride in the exit gas was 90 percent that in the inlet. At this point, chlorine was added to the gas stream at about 1 volume percent and at a mass flow rate of 0.36 gram per 100 gram of catalyst per hour, and water concentration was lowered to 1.1 volume percent. Chlorine was detected at the reactor exit at a chlorine treat equaled to 0.31 gram of chlorine per 100 gram of catalyst. Chlorine injection was extended beyond the point of detection until 0.49 grams of chlorine per 100 grams of catalyst had been introduced into the reactor. The results are given in the Table.

EXAMPLE 2

An alumina catalyst containing 0.3 weight percent iridium and 0.3 weight percent platinum based on the total weight of the catalyst (BET surface area of 170 m$^2$/g) had been used in a commercial reformer in the production of C$_5$+gasoline. Several weight percent of coke deposit was found on the catalyst. The catalyst was regenerated in the reactor with dilute oxygen at a low flame front temperature of 400° C. The metal agglomeration was below 50%. Carbon content of the regenerated catalyst was 0.62 weight percent. Sixty grams of this catalyst was charged into the reactor and the reactivation procedure used was substantially the same as in Example 1 except that in the chlorine treatment, no chlorine was detected up to a chlorine treatment of 3.24 gram per 100 gram of catalyst. The results are shown in the Table.

This example indicates that coke deposit is quantitatively removed in the absence of added oxygen. Complete metal redispersion was obtained when coke deposit was reduced to below 0.1 weight percent. It appears that in the presence of water, chlorine oxidizes carbon to carbon oxides.

EXAMPLE 3

The catalyst of Example 1 was treated in a similar manner as Example 1 except that no water was present in the treat gases and the mass flow rate of the chlorine treat was 2 grams per 100 grams of catalyst per hour. The results are shown in the Table below.

As is seen from the data, coke deposits were not quantitatively removed by the dry chlorine treat since the carbon contents in the three sections were quite uniform. For this particular catalyst, about 0.3 weight percent of coke deposit was the maximum amount that could be removed by dry chlorine treat since more than 2.5 times longer chlorine exposure of catalyst in Section 1, as compared to that in Section 3, did not significantly increase the carbon removal of the former.

TABLE

| Example | % Ir Agglom. TI$^{(a)}$ | S-1 | S-2 | S-3 | % Redis. S-1 | S-2 | S-3 | % Cl I | S-1 | S-2 | S-3 | % C I | S-1 | S-2 | S-3 |
|---|---|---|---|---|---|---|---|---|---|---|---|---|---|---|---|
| 1$^{(b)}$ | 100 | 6 | 17 | 30 | 94 | 83 | 70 | 0.67 | 1.90 | 1.90 | 2.02 | — | — | — | — |
| 2$^{(c)}$ | 49 | 0 | 19 | 46 | 100 | 61 | 6 | 0.78 | 1.70 | 2.10 | 2.40 | 0.62 | 0.09 | 0.12 | 0.46 |
| 3$^{(d)}$ | 49 | 6 | 7 | 34 | 88 | 86 | 31 | 0.78 | 3.3 | 3.3 | 3.3 | 0.62 | 0.31 | 0.32 | 0.36 |

$^{(a)}$Total initial iridium agglomeration.
$^{(b)}$Mass flow rate of Cl$_2$ (g/100 g cat./hr.): 0.36; Amount of Cl$_2$ used until Cl$_2$ detection (g/100 g cat.): 0.31; Amount of Cl$_2$ at the end of the redispersion (g/100 g cat.): 0.49.
$^{(c)}$Mass flow rate of Cl$_2$ (g/100 g cat./hr.): 0.36; Amount of Cl$_2$ at the end of redispersion (g/100 g. cat.): 3.24; no chlorine was detected at reactor exit at end of run.
$^{(d)}$Mass flow rate of Cl$_2$ (g/100 g cat./hr.): 2.0; Amount of Cl$_2$ used until Cl$_2$ detection (g/100 g cat.): 3.1; Amount of Cl$_2$ at the end of the redispersion (g/100 g cat.): 5.1.

What is claimed is:

1. A process for reactivating an agglomerated, coked, iridium-containing catalyst comprising the steps of:
    (a) partially decoking said catalyst in an oxygen-containing atmosphere at a temperature below about 430° C. for a sufficient time so that the remaining catalyst coke level is less than 1 weight percent and the iridium agglomeration on said catalyst is less than about 50 percent;
    (b) reducing said catalyst from step (a) by contact with a reducing atmosphere at elevated temperature for a sufficient time to substantially convert said iridium to metallic iridium;
    (c) pretreating said catalyst from step (b) by contact with an elemental oxygen-free atmosphere comprising a halide providing compound at elevated temperature for a sufficient time to provide the catalyst with about 1.3 weight percent and above halide, taken as the coke-free, dry catalyst; and
    (d) redispersing the metallic iridium from step (c) while maintaining said 1.3 weight percent halide provided to the catalyst by contacting with an atmosphere comprising elemental halogen and water vapor in a halogen/water volume ratio of about 0.2 to 5 at a temperature of about 480° C. and above, for a time sufficient to substantially complete decoking and to effect a 75–100 percent redispersion of said metallic iridium.

2. The process of claim 1 wherein said agglomerated iridium-containing catalyst is present on a catalyst support selected from silica, zeolite, alumina, silica-alumina, zirconia, alumina-zirconia and mixtures thereof.

3. The process of claim 1 wherein said iridium-containing catalyst further contains a metal co-catalyst selected from platinum, rhodium, rhenium, palladium and mixtures thereof.

4. The process of claim 1 wherein said halide providing compound is one which provides a hydrogen halide in the presence of hydrogen gas.

5. The process of claim 1 wherein said halide-providing compound is selected from carbon tetrachloride, chloroform, methylene chloride, methyl chloride, 1,2-dichloroethane, hexachloroethane and mixtures thereof, in the presence of hydrogen gas.

6. The process of claim 1 wherein said halide providing compound is hydrogen chloride.

7. The process of claim 1 wherein said halide is present on the catalyst after step (c) in an amount of about 1.4 to 2.5 weight percent, taken as the coke-free, dry catalyst.

8. The process of claim 1 wherein said catalyst during step (c) under the process conditions is saturated with halide.

9. The process of claim 1 wherein said catalyst is platinum-iridium supported on alumina.

10. The process of claim 1 wherein said catalyst is platinum-iridium-rhenium supported on alumina.

11. The process of claim 1 wherein said reducing atmosphere in step (b) comprises hydrogen gas.

12. The process of claim 1 wherein the temperature in steps (b) and (c) is in the range of about 250° to 600° C.

13. The process of claim 1 wherein said elemental halogen is chlorine.

14. A process for reactivating a coked, agglomerated platinum-iridium on alumina catalyst comprising the steps of:
(a) decoking said catalyst in an oxygen-containing atmosphere at a temperature in the range of about 375° to 430° C., for a sufficient time so that about 0.3 to about 0.8 weight percent carbon remains on said catalyst and iridium metal agglomeration on said catalyst is less than about 50 percent;
(b) contacting said agglomerated catalyst with a hydrogen atmosphere at a temperature in the range of about 300° to 540° C. for a sufficient time to substantially reduce the oxides of platinum and iridium to the respective metals;
(c) contacting said catalyst from step (b) with an elemental oxygen-free and elemental halogen-free atmosphere comprising hydrogen chloride at a temperature in the range of about 300° to 540° C. for a sufficient time to saturate the catalyst with chloride; and
(d) contacting the catalyst from step (c) while maintaining a saturated catalyst chloride level with an atmosphere comprising elemental chlorine and water vapor in a chlorine/water volume ratio of about 0.5 to 2 at a temperature in the range of about 500° to 540° C. for a sufficient time to substantially remove all coke deposits and to effect about a 90 to 100 percent redispersion of metallic platinum and iridium.

* * * * *